(12) United States Patent
Sasaki et al.

(10) Patent No.: US 8,837,089 B1
(45) Date of Patent: Sep. 16, 2014

(54) MAGNETIC HEAD FOR PERPENDICULAR MAGNETIC RECORDING INCLUDING A HEATER

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(73) Assignees: Headway Technologies, Inc., Milpitas, CA (US); SAE Magnetics (H. K.) Ltd., Hong Kong (CN)

( * ) Notice: Subject to any disclaimer, the term of this patent is extended or adjusted under 35 U.S.C. 154(b) by 0 days.

(21) Appl. No.: 13/867,647

(22) Filed: Apr. 22, 2013

(51) Int. Cl.
*G11B 5/147* (2006.01)
*G11B 5/187* (2006.01)

(52) U.S. Cl.
USPC ............................ 360/125.31; 360/125.12

(58) Field of Classification Search
USPC ............... 360/125.03, 125.06, 125.12, 125.3, 360/125.31
See application file for complete search history.

(56) References Cited

U.S. PATENT DOCUMENTS

| 7,729,086 | B1 * | 6/2010 | Song et al. ............... 360/125.31 |
| 8,406,094 | B2 * | 3/2013 | Matsumoto ............... 369/13.33 |
| 2009/0040646 | A1 * | 2/2009 | Akagi et al. .................... 360/59 |
| 2009/0103208 | A1 * | 4/2009 | Aoki et al. ..................... 360/110 |
| 2009/0168220 | A1 * | 7/2009 | Komura et al. .................. 360/59 |
| 2009/0251828 | A1 | 10/2009 | Schreck et al. |
| 2009/0323227 | A1 * | 12/2009 | Zheng et al. .................. 360/313 |
| 2011/0176398 | A1 * | 7/2011 | Tanaka et al. .............. 369/13.33 |
| 2012/0218662 | A1 | 8/2012 | Sasaki et al. |

FOREIGN PATENT DOCUMENTS

JP          A-2008-77751          4/2008

OTHER PUBLICATIONS

U.S. Appl. No. 13/974,732, filed Aug. 23, 2013 in the name of Sasaki et al.

* cited by examiner

*Primary Examiner* — Jefferson Evans
(74) *Attorney, Agent, or Firm* — Oliff PLC

(57) ABSTRACT

A magnetic head includes a main pole and a heater for heating the main pole. The main pole is shaped to have a receiving space formed therein for receiving at least part of the heater. The at least part of the heater is received in the receiving space. The main pole includes a first layer and a second layer stacked. The receiving space is sandwiched between the first layer and the second layer.

7 Claims, 12 Drawing Sheets

MAGNETIC HEAD FOR PERPENDICULAR MAGNETIC RECORDING INCLUDING A HEATER

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a heater for allowing the end face of the main pole located in the medium facing surface to protrude.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of a recording medium by means of an airflow that comes from the leading end into the space between the medium facing surface and the recording medium.

It is demanded of magnetic disk drives that the distance from the end face of the main pole located in the medium facing surface to the surface of the recording medium be reduced in order to provide higher recording densities while preventing the writing capability of the write head unit from being reduced with higher density recording. To meet this, there has been proposed a technology of heating the main pole with a heater to allow the end face of the main pole to protrude to thereby reduce the distance from the end face of the main pole to the surface of the recording medium, as disclosed in U.S. Patent Application Publication Nos. 2009/0251828 A1 and 2012/0218662 A1, for example. U.S. Patent Application Publication Nos. 2009/0251828 A1 and 2012/0218662 A1 each disclose a magnetic head with a heater provided within an insulating layer near the main pole.

In a conventional magnetic head including a heater for heating the main pole, components of the write head unit other than the main pole are also heated by the heater. A typical component of the write head unit other than the main pole is a write shield disclosed in U.S. Patent Application Publication No. 2012/0218662 A1. The write shield has an end face located near the end face of the main pole in the medium facing surface.

For the conventional magnetic head including the heater, since the components of the write head unit other than the main pole are also heated by the heater as mentioned above, it is difficult to allow the end face of the main pole to greatly protrude relative to its neighboring surroundings located in the medium facing surface. The conventional magnetic head thus has a disadvantage that the distance from the end face of the main pole to the surface of the recording medium cannot be sufficiently reduced and therefore it is not possible to achieve sufficiently high recording density. Further, for the conventional magnetic head, the end face of the main pole does not always protrude by the greatest amount when compared with the other parts of the end face of the write head unit located in the medium facing surface. If any part of the end face of the write head unit other than the end face of the main pole protrudes by the greatest amount, it becomes difficult to recognize and control the distance from the end face of the main pole to the surface of the recording medium.

OBJECT AND SUMMARY OF THE INVENTION

It is an object of the present invention to provide a magnetic head for perpendicular magnetic recording that includes a heater for heating the main pole and is capable of increasing the amount of protrusion of the end face of the main pole while suppressing protrusion of portions located around the end face of the main pole in the medium facing surface.

A magnetic head for perpendicular magnetic recording of a first aspect of the present invention includes a medium facing surface facing a recording medium, a coil producing a magnetic field corresponding to data to be written on the recording medium, a main pole, and a heater for heating the main pole. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The main pole is shaped to have a receiving space formed therein for receiving at least part of the heater. The at least part of the heater is received in the receiving space.

In the magnetic head of the first aspect of the present invention, the main pole may include a first layer and a second layer stacked. In this case, the receiving space may be sandwiched between the first layer and the second layer.

In the magnetic head of the first aspect of the present invention, the heater may include a line-shaped conductor that generates heat when energized. In this case, the magnetic head may further include an insulating portion insulating the line-shaped conductor from the main pole.

The magnetic head of the first aspect of the present invention may further include a write shield made of a magnetic material and having an end face located in the medium facing surface, and a gap part made of a nonmagnetic material and provided between the main pole and the write shield.

A magnetic head for perpendicular magnetic recording of a second aspect of the present invention includes a medium facing surface facing a recording medium, a coil producing a magnetic field corresponding to data to be written on the recording medium, a main pole, a magnetic layer made of a magnetic material, and a heater for heating the main pole. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The magnetic layer is located away from the medium facing surface and in contact with a portion of the main pole located away from the medium facing surface. The main pole and the magnetic layer form therebetween a receiving space for receiving at least part of the heater. The at least part of the heater is received in the receiving space.

In the magnetic head of the second aspect of the present invention, the heater may include a line-shaped conductor that generates heat when energized. In this case, the magnetic head may further include an insulating portion insulating the line-shaped conductor from the main pole and the magnetic layer.

The magnetic head of the second aspect of the present invention may further include a write shield made of a magnetic material and having an end face located in the medium facing surface, and a gap part made of a nonmagnetic material and provided between the main pole and the write shield.

The magnetic head of the first aspect of the present invention allows the main pole to be efficiently heated by the heater since at least part of the heater is received in the receiving space formed in the main pole. The present invention thus makes it possible to increase the amount of protrusion of the end face of the main pole while suppressing protrusion of portions located around the end face of the main pole in the medium facing surface.

The magnetic head of the second aspect of the present invention allows the main pole to be efficiently heated by the heater since at least part of the heater is received in the receiving space formed between the main pole and the magnetic layer. The present invention thus makes it possible to increase the amount of protrusion of the end face of the main pole while suppressing protrusion of portions located around the end face of the main pole in the medium facing surface.

Other and further objects, features and advantages of the present invention will appear more fully from the following description.

DETAILED DESCRIPTION OF THE PREFERRED EMBODIMENTS

First Embodiment

Figure 1:
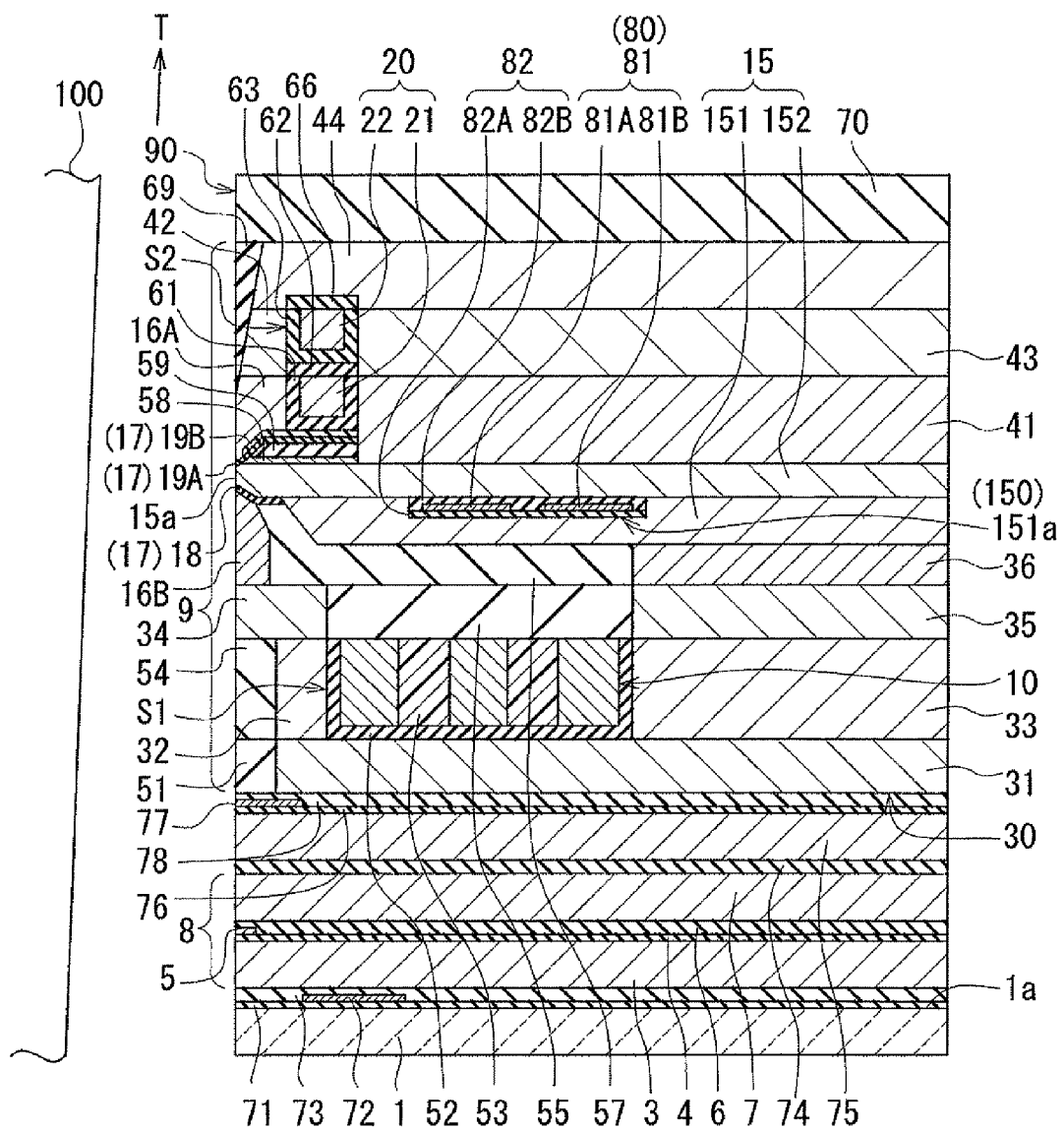
FIG. 1 is a cross-sectional view showing a magnetic head according to a first embodiment of the invention.
Figure 2:
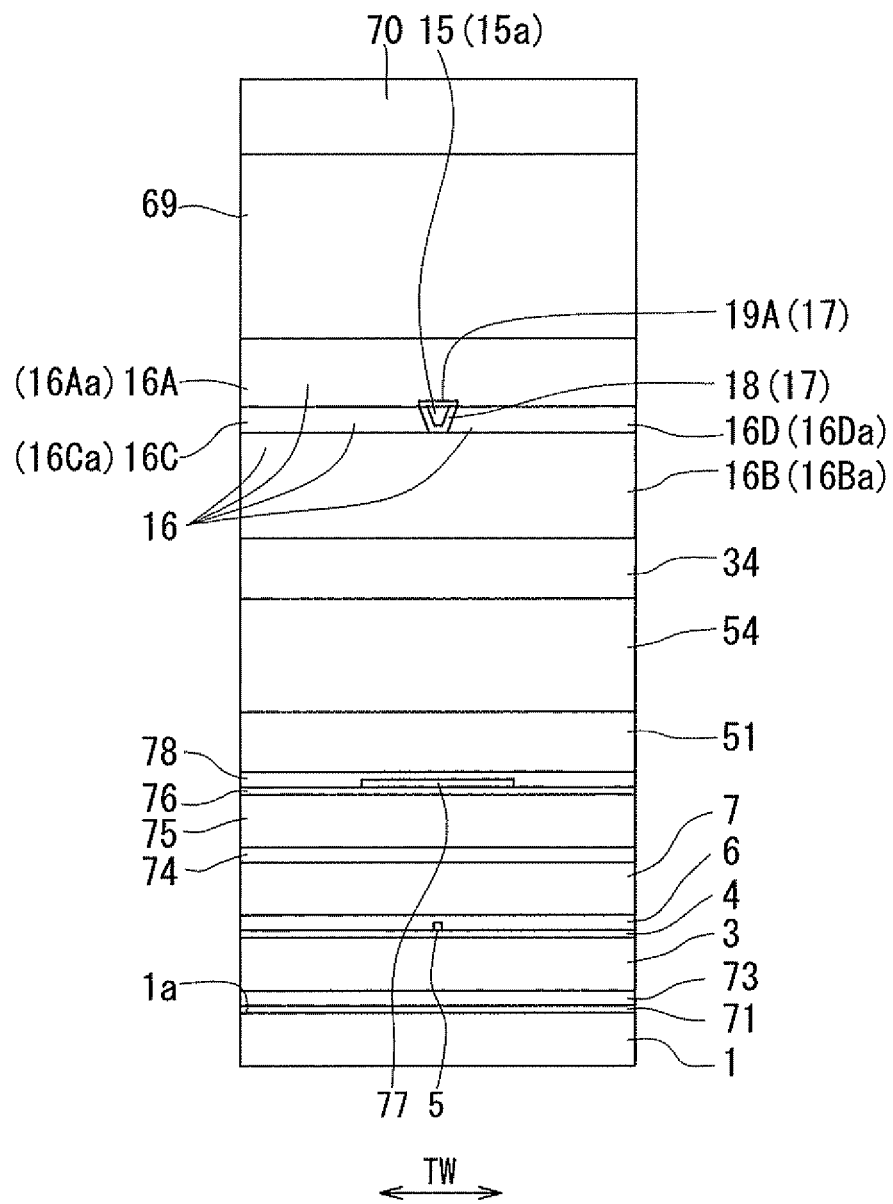
FIG. 2 is a front view showing the medium facing surface of the magnetic head according to the first embodiment of the invention.
Figure 3:
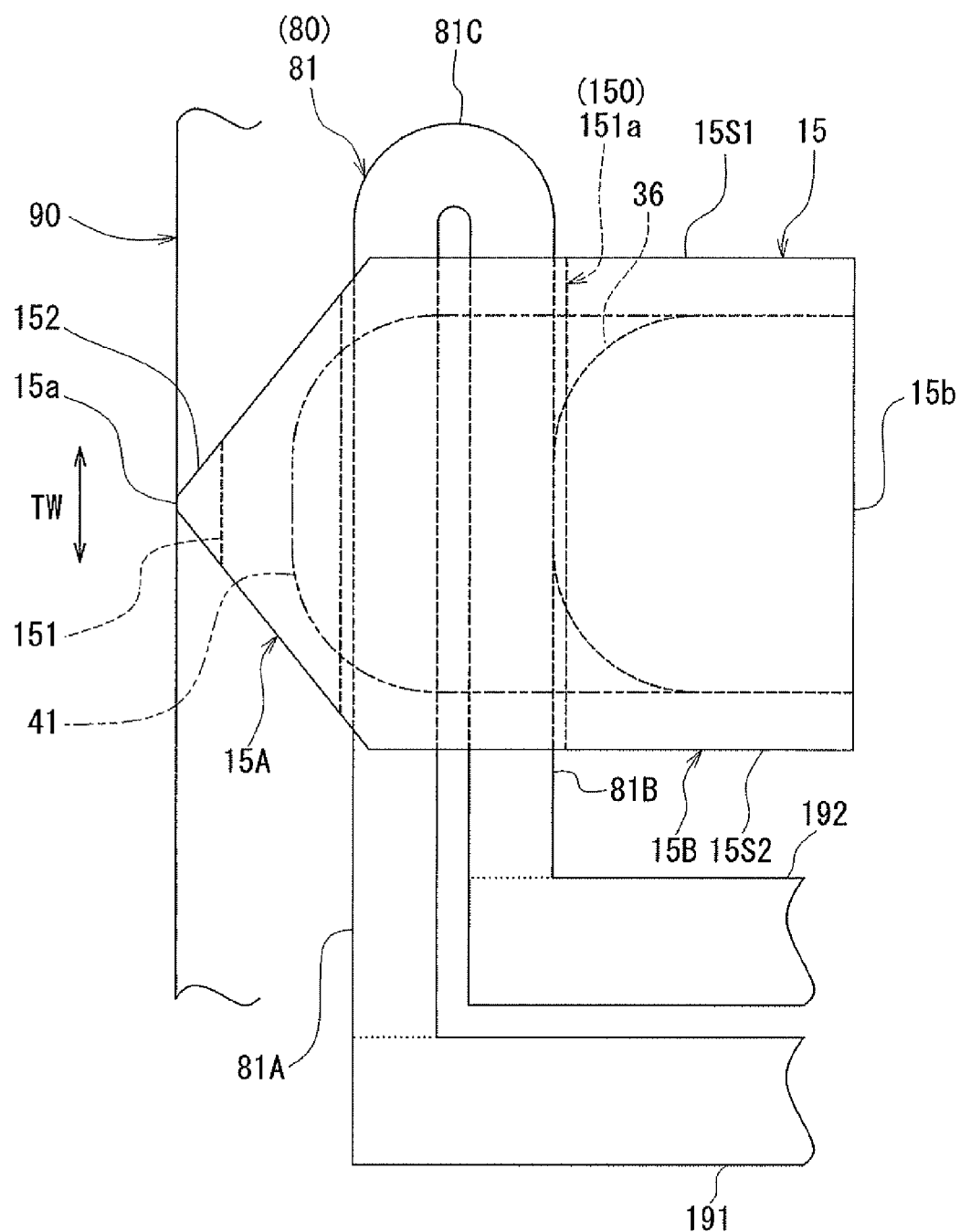
FIG. 3 is a plan view showing a main pole and a heater of the magnetic head according to the first embodiment of the invention.
Figure 4:
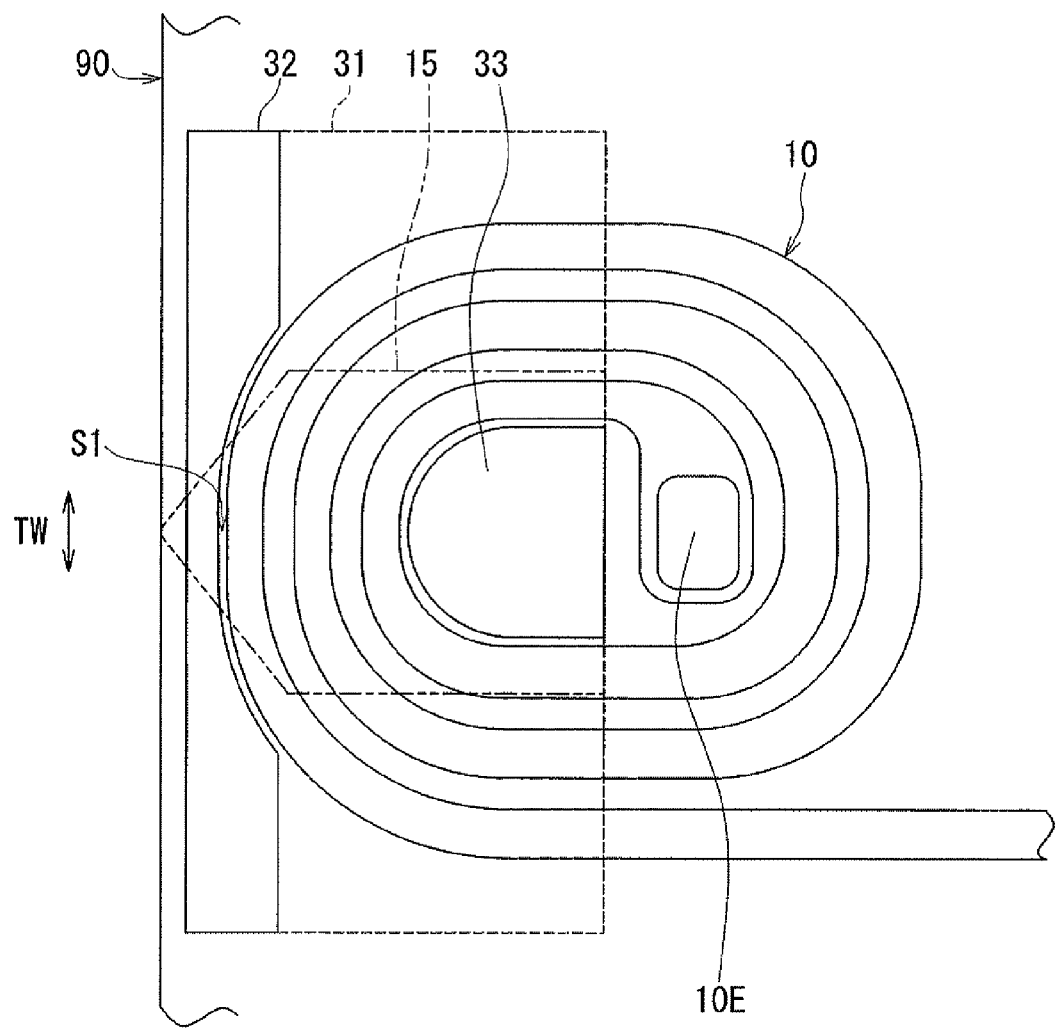
FIG. 4 is a plan view showing a first portion of a coil of the magnetic head according to the first embodiment of the invention.
Figure 5:
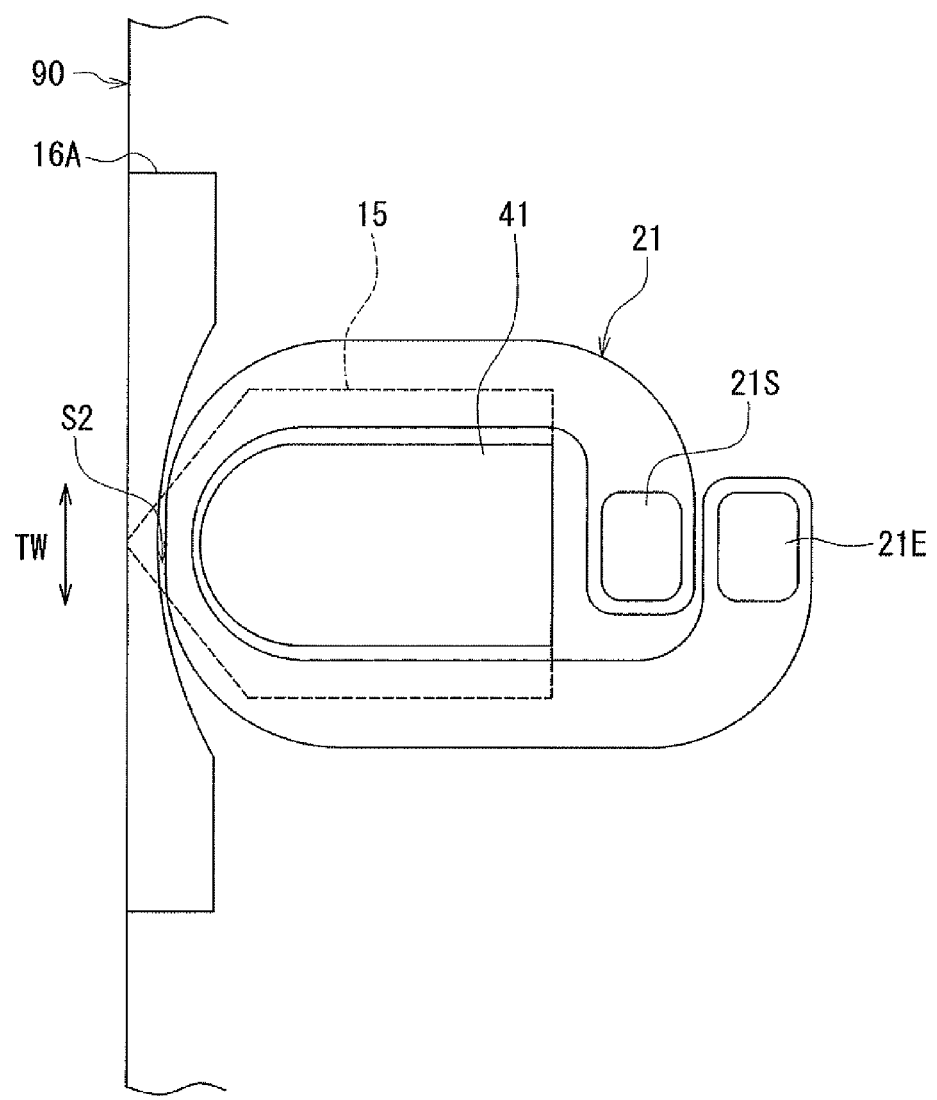
FIG. 5 is a plan view showing a first layer of a second portion of the coil of the magnetic head according to the first embodiment of the invention.
Figure 6:
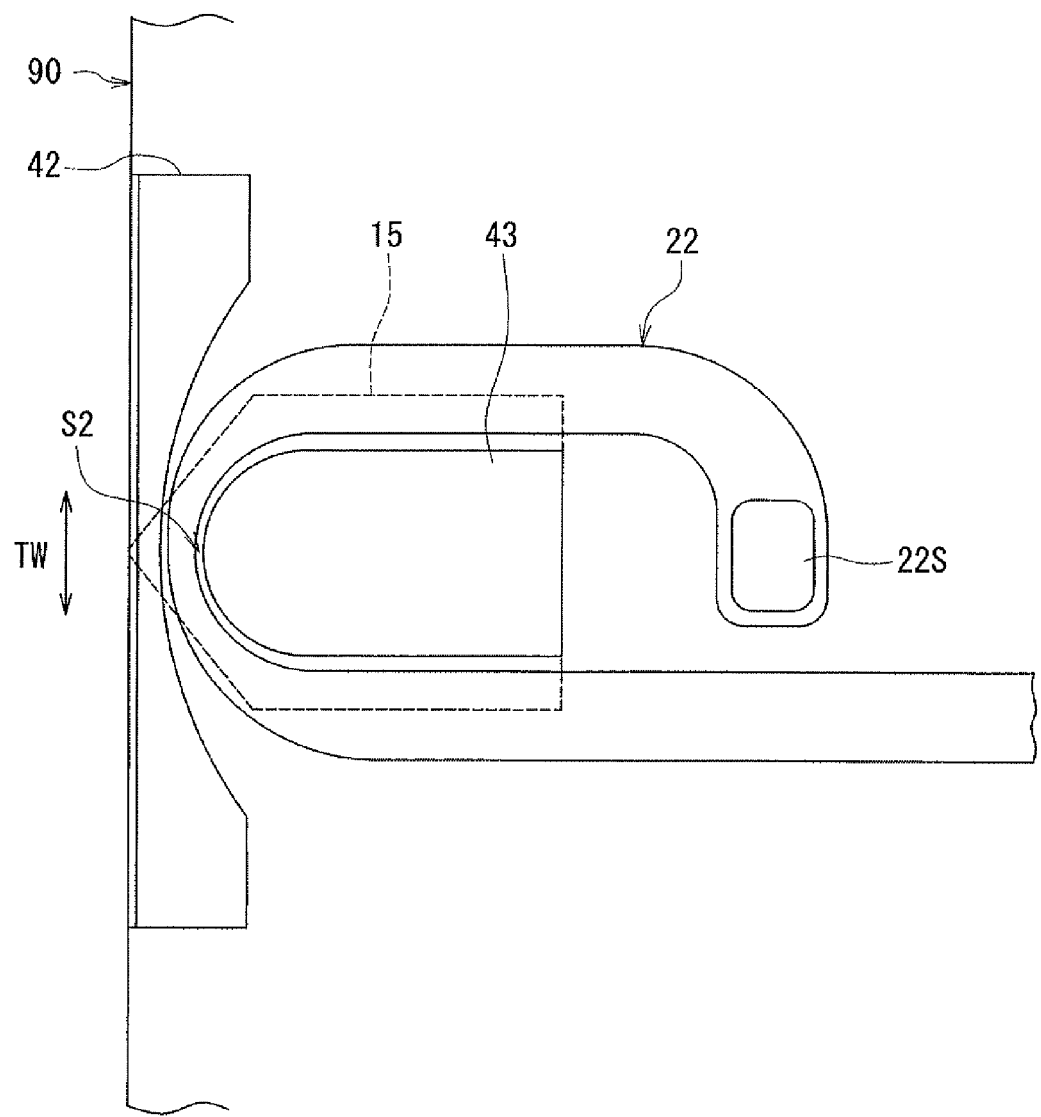
FIG. 6 is a plan view showing a second layer of the second portion of the coil of the magnetic head according to the first embodiment of the invention.

Preferred embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. FIG. 2 is a front view showing the medium facing surface of the magnetic head according to the present embodiment. FIG. 3 is a plan view showing a main pole and a heater of the magnetic head according to the present embodiment. FIG. 4 is a plan view showing a first portion of a coil of the magnetic head according to the present embodiment. FIG. 5 is a plan view showing a first layer of a second portion of the coil of the magnetic head according to the present embodiment. FIG. 6 is a plan view showing a second layer of the second portion of the coil of the magnetic head according to the present embodiment. The arrow with the symbol TW in each of FIG. 2 to FIG. 6 indicates the track width direction.

The magnetic head for perpendicular magnetic recording (hereinafter simply referred to as the magnetic head) according to the present embodiment is for use in, for example, a magnetic disk drive and is in the form of a slider to fly over the surface of a rotating recording medium 100. As shown in FIG. 1, the magnetic head (the slider) has a medium facing surface 90 facing the recording medium 100. The medium facing surface 90 has an air inflow end (a leading end) and an air outflow end (a trailing end). The slider is designed to slightly fly over the surface of the recording medium 100 by means of an airflow that comes from the leading end into the space between the medium facing surface 90 and the recording medium 100.

Here, the side of the positions closer to the leading end relative to a reference position will be defined as the leading side, and the side of the positions closer to the trailing end relative to the reference position will be defined as the trailing side. The leading side is the rear side in the direction T of travel of the recording medium 100 relative to the slider. The trailing side is the front side in the direction T of travel of the recording medium 100 relative to the slider.

As shown in FIG. 1 and FIG. 2, the magnetic head includes a substrate 1 made of a ceramic material such as aluminum oxide titanium carbide ($Al_2O_3$—TiC) and having a top surface 1a, an insulating layer 71 made of an insulating material and disposed on the top surface 1a of the substrate 1, a heater 72 disposed on the insulating layer 71, and an insulating layer 73 made of an insulating material and disposed to cover the insulating layer 71 and the heater 72. The insulating layers 71 and 73 are made of alumina ($Al_2O_3$), for example. The heater 72 will be described in detail later.

The magnetic head further includes a read head unit 8 located on the front side in the direction T of travel of the recording medium 100, i.e., on the trailing side, relative to the insulating layer 73. The read head unit 8 includes a first read shield layer 3 made of a magnetic material and disposed on the insulating layer 73, a first read shield gap film 4 which is an insulating film disposed to cover the first read shield shield layer 3, a magnetoresistive (MR) element 5 serving as a read element disposed on the first read shield gap film 4, a second read shield gap film 6 which is an insulating film disposed on the MR element 5, and a second read shield layer 7 made of a magnetic material and disposed on the second read shield gap film 6.

An end of the MR element 5 is located in the medium facing surface 90. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The magnetic head further includes a nonmagnetic layer 74 made of a nonmagnetic material and disposed on the second read shield layer 7, a middle shield layer 75 made of a magnetic material and disposed on the nonmagnetic layer 74, a nonmagnetic layer 76 made of a nonmagnetic material and disposed on the middle shield layer 75, a contact sensor 77 disposed on the nonmagnetic layer 76, and a nonmagnetic layer 78 made of a nonmagnetic material and disposed to cover the nonmagnetic layer 76 and the contact sensor 77. The nonmagnetic layers 74, 76 and 78 are made of alumina, for example. The contact sensor 77 will be described in detail later.

The magnetic head further includes a write head unit 9 disposed on the nonmagnetic layer 78. The middle shield layer 75 has the function of shielding the MR element 5 from magnetic fields generated in the write head unit 9. The write head unit 9 includes a coil, a main pole 15, a write shield 16, a gap part 17, and a heater 80 for heating the main pole 15.

The coil produces a magnetic field corresponding to data to be written on the recording medium 100. The coil includes a first portion 10 and a second portion 20. The first portion 10 and the second portion 20 are both made of a conductive material such as copper. The first portion 10 and the second portion 20 are connected in series or in parallel. The main pole 15 has an end face 15a located in the medium facing surface 90. The main pole 15 allows a magnetic flux corresponding to the magnetic field produced by the coil to pass, and produces a write magnetic field for writing data on the recording medium 100 by means of a perpendicular magnetic recording system. FIG. 1 and FIG. 2 each show a cross section that intersects the end face 15a of the main pole 15 located in the medium facing surface 90 and that is perpendicular to the medium facing surface 90 and to the top surface 1a of the substrate 1 (this cross section will hereinafter be referred to as the main cross section).

The write shield 16 has an end face located in the medium facing surface 90. The end face of the write shield 16 includes first to fourth end face portions 16Aa, 16Ba, 16Ca, and 16Da. The first end face portion 16Aa is located on the front side in the direction T of travel of the recording medium 100 relative to the end face 15a of the main pole 15. The second end face portion 16Ba is located on the rear side in the direction T of travel of the recording medium 100 relative to the end face 15a of the main pole 15. The third and fourth end face portions 16Ca and 16Da are located on opposite sides of the end face 15a of the main pole 15 in the track width direction TW. In the medium facing surface 90, the first to fourth end face portions 16Aa, 16Ba, 16Ca, and 16Da are arranged to wrap around the end face 15a of the main pole 15.

The write shield 16 is made of a magnetic material. The material used for the write shield 16 may be CoFeN, CoNiFe, NiFe, or CoFe, for example.

The write head unit 9 further includes a first return path section 30 and a second return path section 40. The first and second return path sections 30 and 40 are each made of a magnetic material. The material used for each of the first and second return path sections 30 and 40 may be CoFeN, CoNiFe, NiFe, or CoFe, for example. The first return path section 30 and the second return path section 40 align along a direction perpendicular to the top surface 1a of the substrate 1 with the main pole 15 interposed therebetween. The first return path section 30 is located on the rear side in the direction T of travel of the recording medium 100 relative to the main pole 15, and connects the write shield 16 and part of the main pole 15 away from the medium facing surface 90 to each other, thereby magnetically coupling the write shield 16 and the main pole 15 to each other. The second return path section 40 is located on the front side in the direction T of travel of the recording medium 100 relative to the main pole 15, and connects the write shield 16 and part of the main pole 15 away from the medium facing surface 90 to each other, thereby magnetically coupling the write shield 16 and the main pole 15 to each other.

The first return path section 30 includes magnetic layers 31, 32, 33, 34, 35, and 36. The magnetic layer 31 lies on the nonmagnetic layer 73. The magnetic layers 32 and 33 both lie on the magnetic layer 31. The magnetic layer 32 is located near the medium facing surface 90. The magnetic layer 33 is located farther from the medium facing surface 90 than is the magnetic layer 32. Each of the magnetic layers 31 and 32 has an end face that faces toward the medium facing surface 90 and that is located at a distance from the medium facing surface 90. As shown in FIG. 4, the first portion 10 of the coil is wound approximately three turns around the magnetic layer 33.

The magnetic head further includes: an insulating layer 51 made of an insulating material, disposed on the nonmagnetic layer 78 and surrounding the magnetic layer 31; an insulating film 52 made of an insulating material and isolating the first portion 10 from the magnetic layers 31 to 33; an insulating layer 53 made of an insulating material and disposed in the space between adjacent turns of the first portion 10; and an insulating layer 54 made of an insulating material and disposed around the first portion 10 and the magnetic layer 32. The top surfaces of the first portion 10, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

The magnetic layer 34 is disposed on the magnetic layer 32 and the insulating layer 54. The magnetic layer 34 has an end face located in the medium facing surface 90. The magnetic layer 35 is disposed on the magnetic layer 33. The magnetic head further includes an insulating layer 55 made of an insulating material. The insulating layer 55 is disposed over the first portion 10, the insulating film 52 and the insulating layer 53 and surrounds the magnetic layers 34 and 35. The insulating layer 55 is made of alumina, for example. The top surfaces of the magnetic layers 34 and 35 and the insulating layer 55 are even with each other.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium 100 relative to the main pole 15. The second shield 16B is located on the rear side in the direction T of travel of the recording medium 100 relative to the main pole 15. The side shields 16C and 16D magnetically couple the first shield 16A and the second shield 16B to each other.

As shown in FIG. 1 and FIG. 2, the first shield 16A has the first end face portion 16Aa, and also has a top surface, a bottom surface, and a connecting surface connecting the first end face portion 16Aa and the top surface to each other. The distance from the medium facing surface 90 to an arbitrary point on the connecting surface of the first shield 16A increases with increasing distance from the arbitrary point to the top surface 1a of the substrate 1. The second shield 16B has the second end face portion 16Ba, and also has a top surface and a bottom surface. The distance from the top surface 1a of the substrate 1 to an arbitrary point on tae top surface of the second shield 16B decreases with increasing distance from the arbitrary point to the medium facing surface 90. As shown in FIG. 2, the side shield 16C has the third end face portion 16Ca. The side shield 16D has the fourth end face portion 16Da.

The second shield 16B lies on the magnetic layer 34. The magnetic layer 36 lies on the magnetic layer 35. The magnetic layer 36 is located away from the medium facing surface 90 and in contact with a portion of the main pole 15 located away from the medium facing surface 90. More specifically, the magnetic layer 36 is in contact with a portion of the bottom surface of the main pole 15 located away from the medium facing surface 90. The magnetic head further includes a nonmagnetic layer 57 made of a nonmagnetic material. The nonmagnetic layer 57 lies on part of the top surface of the magnetic layer 34 and on the top surface of the insulating layer 55, and surrounds the second shield 16B and the magnetic layer 36. The nonmagnetic layer 57 is made of alumina, for example.

As shown in FIG. 1, the main pole 15 has the end face 15a, a top surface located at a forward end in the direction T of travel of the recording medium 100, and a bottom surface opposite to the top surface. Further, as shown in FIG. 3, the main pole 15 has a first side part 15S1 and a second side part 15S2 opposite to each other in the track width direction TW, and a rear end 15b farthest from the medium facing surface 90. The side shield 16C has a first sidewall opposed to the first side part 15S1 of the main pole 15. The side shield 16D has a second sidewall opposed to the second side part 15S2 of the main pole 15.

The gap part 17 is provided between the main pole 15 and the write shield 16. The magnetic head further includes a first gap layer 19A made of a nonmagnetic material and including a portion that constitutes a first portion of the gap part 17, a second gap layer 19B made of a nonmagnetic material and including a portion that constitutes a second portion of the gap part 17, and a third gap layer 18 made of a nonmagnetic material and including a portion that constitutes a third portion of the gap part 17. The portion of the first gap layer 19A constituting the first portion of the gap part 17 is located on a portion of the top surface of the main pole 15. The portion of the second gap layer 19B constituting the second portion of the gap part 17 is located on a portion of the top surface of the first gap layer 19A other than a portion near the medium facing surface 90. The first and second gap layers 19A and 19B are provided between the main pole 15 and the first shield 16A. The portion of the third gap layer 18 constituting the third portion of the gap part 17 is located between the main pole 15 and each of the second shield 16B and the side shields 16C and 16D.

The side shields 16C and 16D are disposed on the second shield 16B. The third gap layer 18 is arranged to extend along the sidewalls of the side shields 16C and 16D, the top surface of the second shield 16B, and part of the top surface of the nonmagnetic layer 57. The nonmagnetic material used to form the third gap layer 18 may be an insulating material or a nonmagnetic metal material. Alumina is an example of an insulating material that can be used to form the third gap layer 18. Ru is an example of a nonmagnetic metal material that can be used to form the third gap layer 18.

The main pole 15 is disposed on the second shield 16B and the nonmagnetic layer 57 such that the third gap layer 18 is interposed between the main pole 15 and each of the top surface of the second shield 16B and the part of the top surface of the nonmagnetic layer 57. As shown in FIG. 2, the third gap layer 18 is interposed also between the main pole 15 and each of the side shields 16C and 16D.

A part of the bottom surface of the main pole 15 located away from the medium facing surface 90 is in contact with the top surface of the magnetic layer 36. The main pole 15 is made of a magnetic metal material. The material used for the main pole 15 may be one of NiFe, CoNiFe, and CoFe, for example.

The main pole 15 is shaped to have a receiving space 150 formed therein for receiving at least part of the heater 80. The at least part of the heater 80 is received in the receiving space 150. The main pole 15, the receiving space 150, and the heater 80 will be described in detail later.

The magnetic head further includes a first nonmagnetic layer (not illustrated) made of a nonmagnetic material and disposed around the main pole 15 and the side shields 16C and 16D. The first nonmagnetic layer is made of alumina, for example.

The magnetic head further includes a nonmagnetic metal layer 58 made of a nonmagnetic metal material, located away from the medium facing surface 90 and lying on part of the top surface of the main pole 15, and an insulating layer 59 made of an insulating material and lying on the top surface of the nonmagnetic metal layer 58. The nonmagnetic metal layer 58 is made of Ru, NiCr, or NiCu, for example. The insulating layer 59 is made of alumina, for example.

The first gap layer 19A is disposed to cover the main pole 15, the nonmagnetic metal layer 58 and the insulating layer 59. The material used for each of the first and second gap layers 19A and 19B may be a nonmagnetic insulating material such as alumina or a nonmagnetic conductive material such as Ru, NiCu, Ta, W, NiB, or NiP.

The first shield 16A is disposed over the side shields 16C and 16D, the first gap layer 19A and the second gap layer 19B. In the medium facing surface 90, part of the first end face portion 16Aa of the first shield 16A is spaced from the end face 15a of the main pole 15 by a predetermined distance created by the thickness of the first gap layer 19A. The thickness of the first gap layer 19A preferably falls within the range of 5 to 60 nm, and may be 30 to 60 nm, for example. The end face 15a of the main pole 15 has a side adjacent to the first gap layer 19A. This side of the end face 15a defines the track width.

The second return path section 40 includes magnetic layers 41, 42, 43, and 44. The magnetic layer 41 is located away from the medium facing surface 90 and in contact with a portion of the main pole 15 located away from the medium facing surface 90. More specifically, the magnetic layer 41 is in contact with a portion of the top surface of the main pole 15 located away from the medium facing surface 90.

The second portion 20 of the coil includes a first layer 21 and a second layer 22. As shown in FIG. 5, the first layer 21 is wound one turn around the magnetic layer 41. The magnetic head further includes an insulating film 61 made of an insulating material and isolating the first layer 21 from the first shield 16A, the second gap layer 19B and the magnetic layer 41, and a second nonmagnetic layer (not illustrated) made of a nonmagnetic material and disposed around the first layer 21 and the first shield 16A. The insulating film 61 and the second nonmagnetic layer are made of alumina, for example. The top surfaces of the first shield 16A, the first layer 21, the magnetic layer 41, the insulating film 61, and the second nonmagnetic layer are even with each other.

The magnetic head further includes an insulating layer 62 made of an insulating material and disposed over the top surfaces of the first layer 21 and the insulating film 61. The insulating layer 62 is made of alumina, for example.

The magnetic layer 42 is disposed on the first shield 16A. The magnetic layer 42 has an end face that faces toward the medium facing surface 90 and that is located at a distance from the medium facing surface 90. The distance from the medium facing surface 90 to an arbitrary point on the end face of the magnetic layer 42 increases with increasing distance from the arbitrary point to the top surface 1a of the substrate 1.

The magnetic layer 43 is disposed on the magnetic layer 41. As shown in FIG. 6, the second layer 22 is wound approximately one turn around the magnetic layer 43. The magnetic head further includes an insulating film 63 made of an insulating material and isolating the second layer 22 from the magnetic layers 42 and 43 and the insulating layer 62, and a third nonmagnetic layer (not illustrated) made of a nonmagnetic material and disposed around the second layer 22 and the magnetic layer 42. The insulating film 63 and the third nonmagnetic layer are made of alumina, for example. The top surfaces of the second layer 22, the magnetic layers 42 and 43, the insulating film 63, and the third nonmagnetic layer are even with each other. The magnetic head further includes an insulating layer 66 made of an insulating material and disposed over the top surfaces of the second layer 22 and the insulating film 63. The insulating layer 66 is made of alumina, for example.

The magnetic layer 44 is disposed over the magnetic layers 42 and 43 and the insulating layer 66, and connects the magnetic layer 42 and the magnetic layer 43 to each other. The magnetic layer 44 has an end face that faces toward the medium facing surface 90 and that is located at a distance from the medium facing surface 90. The distance from the medium facing surface 90 to an arbitrary point on the end face of the magnetic layer 44 increases with increasing distance from the arbitrary point to the top surface 1a of the substrate 1.

The magnetic head further includes a nonmagnetic layer 69 made of a nonmagnetic material and disposed around the magnetic layer 44, and a protective layer 70 made of a nonmagnetic material and disposed to cover the write head unit 9. Part of the nonmagnetic layer 69 is interposed between the medium facing surface 90 and each of the connecting surface of the first shield 16A and the respective end faces of the magnetic layers 42 and 44 facing toward the medium facing surface 90. The nonmagnetic layer 69 and the protective layer 70 are made of alumina, for example.

As has been described, the magnetic head according to the present embodiment includes the medium facing surface 90, the read head unit 8, the write head unit 9, the heater 72, and the contact sensor 77. The read head unit 8 is located on the rear side in the direction T of travel of the recording medium 100, i.e., the leading side, relative to the write head unit 9.

The heater 72 is located on the rear side in the direction T of travel of the recording medium 100, i.e., the leading side, relative to the read head unit 8. The heater 72 is provided for allowing part of the medium facing surface 90, mainly the end face of the read head unit 8 located in the medium facing surface 90, to protrude toward the recording medium 100. The heater 72 includes a line-shaped conductor that generates heat when energized. The line-shaped conductor may be meandering in shape. The magnetic head according to the present embodiment includes a pair of leads (not illustrated) connected to opposite ends of the line-shaped conductor. The line-shaped conductor is configured to be energized through the pair of leads to thereby generate heat. For example, the line-shaped conductor is formed of a film of NiCr or a layered film consisting of Ta, NiCu, and Ta films.

The heat generated by the line-shaped conductor is transferred to a plurality of components of the magnetic head located near the heater 72, such as the read shield layers 3 and 7 and the middle shield layer 75. The plurality of components of the magnetic head located near the heater 72 are thus heated by the heater 72. These components expand by being heated. As a result, part of the medium facing surface 90, mainly the end face of the read head unit 8, protrudes toward the recording medium 100.

The contact sensor 77 is disposed between the read head unit 8 and the write head unit 9. The contact sensor 77 is provided for detecting contact of part of the medium facing surface 90 with the recording medium 100. The contact sensor 77 is a resistor that varies in resistance with a change in its own temperature upon contact of part of the medium facing surface 90 with the recording medium 100. The resistor extends in the track width direction TW. The magnetic head according to the present embodiment includes a pair of leads (not illustrated) connected to opposite ends of the resistor. The resistor is made of a metal material or a semiconductor material that varies in resistance at a relatively high rate with respect to a change in temperature, i.e., that has a relatively high temperature coefficient of resistance. Specifically, the material for the resistor may be NiFe, W, Cu, Ni, or Pt, for example.

Upon contact of part of the medium facing surface 90 with the recording medium 100, the frictional heat resulting from the contact raises the temperature of the medium facing surface 90 at and in the vicinity of the part in contact with the recording medium 100. Such a rise in temperature also raises the temperature of the contact sensor 77 (the resistor) itself. As a result, the contact sensor 77 varies in resistance. It is thus possible to detect contact of part of the medium facing surface 90 with the recording medium 100 by measuring the resistance of the contact sensor 77 through the pair of leads.

The write head unit 9 includes the coil including the first and second portions 10 and 20, the main pole 15, the write shield 16, the gap part 17, the first and second return path sections 30 and 40, and the heater 80. The write shield 16 includes the first shield 16A, the second shield 16B, and the two side shields 16C and 16D.

The first return path section 30 includes the magnetic layers 31 to 36, and is located on the rear side in the direction T of travel of the recording medium 100 relative to the main pole 15. As shown in FIG. 1, the first return path section 30 connects the write shield 16 and part of the main pole 15 located away from the medium facing surface 90 to each other so that a first space S1 is defined by the main pole 15, the gap part 17 (the gap layer 18), the write shield 16, and the first return path section 30 (the magnetic layers 31 to 36). The first portion 10 of the coil passes through the first space S1.

The magnetic layer 31 is located closer to the top surface 1*a* of the substrate 1 than is the first space S1. The magnetic layer 32 has an end face that faces toward the medium facing surface 90 and that is located at a distance from the medium facing surface 90. Part of the insulating layer 54 is interposed between the medium facing surface 90 and the aforementioned end face of the magnetic layer 32. The magnetic layer 32 is interposed between the first space S1 and the medium facing surface 90 without being exposed in the medium facing surface 90, and is connected to the magnetic layer 31. The magnetic layer 34 magnetically couples the second shield 16B of the write shield 16 and the magnetic layer 32 to each other. In the main cross section, the magnetic layer 34 is greater than the second shield 16B in length in a direction perpendicular to the medium facing surface 90. The magnetic layers 33, 35 and 36 are located farther from the medium facing surface 90 than is the first space S1, and magnetically couple the main pole 15 and the magnetic layer 31 to each other.

The second return path section 40 includes the magnetic layers 41 to 44, and is located on the front side in the direction T of travel of the recording medium 100 relative to the main pole 15. The second return path section 40 connects the write shield 16 and part of the main pole 15 located away from the medium facing surface 90 to each other so that a second space S2 is defined by the main pole 15, the gap part 17 (the gap layers 19A and 19B), the write shield 16, and the second return path section 40 (the magnetic layers 41 to 44). The second portion 20 of the coil passes through the second space S2.

The first and second portions 10 and 20 of the coil will now be described in detail with reference to FIG. 4 to FIG. 6. FIG. 4 is a plan view showing the first portion 10. The first portion 10 is wound approximately three turns around the magnetic layer 33 which constitutes part of the first return path section 30. The first portion 10 includes a portion that extends to pass between the magnetic layer 32 and the magnetic layer 33, in particular, within the first space S1. The first portion 10 has a coil connection 10E electrically connected to the second portion 20.

FIG. 5 is a plan view showing the first layer 21 of the second portion 20. The first layer 21 is wound one turn around the magnetic layer 41 which constitutes part of the second return path section 40. The first layer 21 includes a portion that extends to pass between the first shield 16A and the magnetic layer 41, in particular, within the second space S2. The first layer 21 has a coil connection 21S electrically connected to the coil connection 10E of the first portion 10, and a coil connection 21E electrically connected to the second layer 22. The coil connection 21S is electrically connected to the coil connection 10E via first to third connection layers of columnar shape (not illustrated) that penetrate a plurality of layers interposed between the first layer 21 and the first portion 10. The first to third connection layers are stacked in this order on the coil connection 10E. The coil connection 21S is disposed on the third connection layer. The first to third connection layers are each made of a conductive material such as copper.

FIG. 6 is a plan view showing the second layer 22 of the second portion 20. The second layer 22 is wound approximately one turn around the magnetic layer 43 which constitutes part of the second return path section 40. The second layer 22 includes a portion that extends to pass between the magnetic layer 42 and the magnetic layer 43, in particular, within the second space S2. The second layer 22 has a coil connection 22S penetrating the insulating layer 62 and the insulating film 63 and electrically connected to the coil connection 21E of the first layer 21. In the example shown in FIG. 4 to FIG. 6, the first portion 10 and the second portion 20 are connected in series.

The shape of the main pole 15 will now be described in detail with reference to FIG. 1 and FIG. 3. As previously mentioned, the main pole 15 has the top surface, the bottom surface, the first side part 15S1, and the second side part 15S2.

Further, as shown in FIG. 3, the main pole 15 includes a width changing portion 15A and a constant width portion 15B, for example. The width changing portion 15A has an end face located in the medium facing surface 90, and an end opposite to the end face. The constant width portion 15B is connected to the end of the width changing portion 15A. The width in the track width direction TW of the top surface of the width changing portion 15A gradually increases with increasing distance from the medium facing surface 90. The width in the track width direction TW of the top surface of the constant width portion 15B is constant regardless of the distance from the medium facing surface 90. The top surface of the width changing portion 15A and that of the constant width portion 15B have the same width in the track width direction TW at the boundary between the width changing portion 15A and the constant width portion 15B. The end face of the width changing portion 15A located in the medium facing surface 90 also serves as the end face 15*a* of the main pole 15 located in the medium facing surface 90.

The main pole 15 may further include a track width defining portion located between the width changing portion 15A and the medium facing surface 90. The width in the track width direction TW of the top surface of the track width defining portion is generally constant regardless of the distance from the medium facing surface 90. The top surface of the track width defining portion and that of the width changing portion 15A have the same width in the track width direction TW at the boundary between the track width defining portion and the width changing portion 15A.

As shown in FIG. 2, the end face 15*a* of the main pole 15 located in the medium facing surface 90 has a first side adjacent to the first gap layer 19, a second side connected to an end of the first side, and a third side connected to the other end of the first side. The first side defines the track width. The position of an end of a record bit to be recorded on the recording medium 100 depends on the position of the first side. The width in the track width direction TW of the end face 15*a* of the main pole 15 located in the medium facing surface 90 decreases with increasing distance from the first side. Each of the second side and the third side forms an angle of, for example, 7° to 17°, or preferably 10° to 15°, relative to a direction perpendicular to the first side. The first side has a length in the range of 0.05 to 0.20 µm, for example.

The main pole 15 is shaped to have the receiving space 150 formed therein for receiving at least part of the heater 80. The main pole 15, the receiving space 150, and the heater 80 will now be described in detail. As shown in FIG. 1, the main pole 15 includes a first layer 151 and a second layer 152 stacked. The receiving space 150 is sandwiched between the first layer 151 and the second layer 152.

The first layer 151 has a bottom surface, a top surface, and an end face facing toward the medium facing surface 90. The end face of the first layer 151 is located at a distance from the medium facing surface 90. The second layer 152 is located on the top surface of the first layer 151. The second layer 152 has a bottom surface, a top surface, and an end face located in the medium facing surface 90. The end face of the second layer 152 located in the medium facing surface 90 also serves as the end face 15a of the main pole 15 located in the medium facing surface 90.

The first layer 151 has a recess 151a that opens at the top surface of the first layer 151. As shown in FIG. 3, the recess 151a extends in the track width direction TW. Opposite ends of the recess 151a in the track width direction TW are located at the first and second side parts 15S1 and 15S2 of the main pole 15. The opening of the recess 151a is capped by the bottom surface of the second layer 152. The receiving space 150 is a space defined by the bottom and the sidewalls of the recess 151a and the bottom surface of the second layer 152.

At least part of the heater 80 is received in the receiving space 150. The heater 80 of the present embodiment includes a line-shaped conductor 81 that generates heat when energized. The magnetic head further includes an insulating portion 82 made of an insulating material and insulating the line-shaped conductor 81 from the main pole 15. The insulating portion 82 includes an insulating layer 82A and an insulating layer 82B stacked. The insulating layer 82A is formed on the bottom of the recess 151a. At least part of the line-shaped conductor 81 is located on the insulating layer 82A. The insulating layer 82B covers the insulating layer 82A and the at least part of the line-shaped conductor 81. The insulating layers 82A and 82B are made of alumina, for example.

The line-shaped conductor 81 includes two linear portions 81A and 81B extending linearly in the track width direction TW, and an connecting portion 81C connecting one end of the linear portion 81A to one end of the linear portion 81B. The connecting portion 81C is U-shaped, for example. The linear portion 81B is located farther from the medium facing surface 90 than is the linear portion 81A. A part of each of the linear portions 81A and 81B is located in the receiving space 150. One end and the other end of the linear portion 81A, one end and the other end of the linear portion 81B, and the connecting portion 81C are located outside the receiving space 150.

The magnetic head according to the present embodiment includes a pair of leads 191 and 192 connected to the other end of the linear portion 81A and the other end of the linear portion 81B, respectively. The line-shaped conductor 81 is configured to be energized through the pair of leads 191 and 192 to thereby generate heat. In FIG. 3, the boundary between the linear portion 81A and the lead 191 and the boundary between the linear portion 81B and the lead 192 are shown by dotted lines. For example, the line-shaped conductor 81 is formed of a film of NiCr or a layered film consisting of Ta, NiCu, and Ta films. The function of the heater 80 will be described in detail later.

The function and effects of the magnetic head according to the present embodiment will now be described. The magnetic head writes data on the recording medium 100 by using the write head unit 9 and reads data stored on the recording medium 100 by using the read head unit 8. In the write head unit 9, the coil including the first and second portions 10 and 20 produces magnetic fields corresponding to data to be written on the recording medium 100. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium 100 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 100. The write shield 16 also has the function of capturing a magnetic flux produced from the end face 15a of the main pole 15 and spreading in directions other than the direction perpendicular to the plane of the recording medium 100, so as to prevent the magnetic flux from reaching the recording medium 100.

Furthermore, the write shield 16 and the first and second return path sections 30 and 40 have the function of allowing a magnetic flux that has been produced from the end face 15a of the main pole 15 and has magnetized the recording medium 100 to flow back. More specifically, a part of the magnetic flux that has been produced from the end face 15a of the main pole 15 and has magnetized the recording medium 100 flows back to the main pole 15 through the write shield 16 and the first return path section 30. Another part of the magnetic flux that has been produced from the end face 15a of the main pole 15 and has magnetized the recording medium 100 flows back to the main pole 15 through the write shield 16 and the second return path section 40.

The write shield 16 includes the first shield 16A, the second shield 16B, and the two side shields 16C and 16D. The present embodiment thus makes it possible that, in regions on both the front side and the rear side in the direction T of travel of the recording medium 100 relative to the end face 15a of the main pole 15 and regions on opposite sides of the end face 15a of the main pole 15 in the track width direction TW, a magnetic flux that is produced from the end face 15a of the main pole 15 and spreads in directions other than the direction perpendicular to the plane of the recording medium 100 can be captured and thereby prevented from reaching the recording medium 100. Consequently, the present embodiment makes it possible to prevent the occurrence of a phenomenon that signals already written on one or more tracks in the neighborhood of a track targeted for writing are erased or attenuated during writing of a signal on the track targeted for writing.

Figure 7:
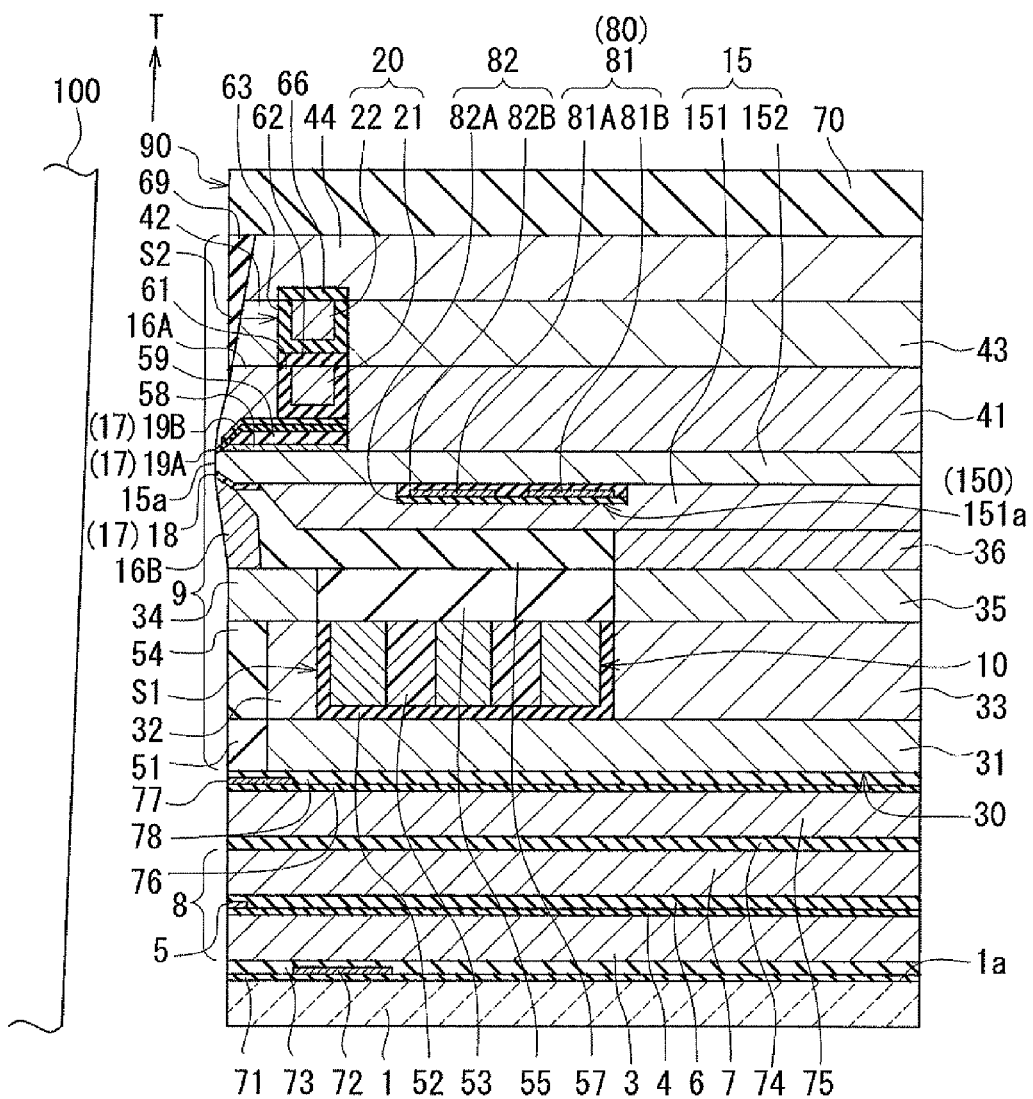
FIG. 7 is an explanatory diagram showing a protruded state of the end face of the main pole of the magnetic head according to the first embodiment of the invention.

The function of the heater 80 will now be described in detail. The line-shaped conductor 81 of the heater 80 generates heat when energized. The heat generated by the line-shaped conductor 81 is transferred to the main pole 15. The main pole 15 is thus heated by the heater 80. The main pole 15 expands by being heated, and as a result, the end face 15a of the main pole 15 located in the medium facing surface 90 protrudes toward the recording medium 100. FIG. 7 shows the state in which the end face 15a of the main pole 15 protrudes in this way. This reduces the distance from the end face 15a of the main pole 15 to the surface of the recording medium 100, thereby allowing the enhancement of recording density.

Now, a magnetic head of a comparative example having a heater provided outside the main pole 15, in place of the heater 80, will be discussed. In the magnetic head of the comparative example, components other than the main pole 15 are also heated by the heater. It is thus difficult for the magnetic head of the comparative example to allow the end face 15a of the main pole 15 to greatly protrude relative to its neighboring surroundings located in the medium facing surface 90. The magnetic head of the comparative example thus has a disadvantage that the distance from the end face 15a of the main pole 15 to the surface of the recording medium 100 cannot be sufficiently reduced and therefore it is not possible to achieve sufficiently high recording density. Further, for the magnetic head of the comparative example, the end face 15a of the main pole 15 does not always protrude by the greatest amount when compared with the other parts of the end face of the write head unit 9 located in the medium facing surface 90. If any part of the end face of the write head unit 9 other than the end face 15a of the main pole 15 protrudes by the greatest amount, there arises a problem that it is difficult to recognize and control the distance from the end face 15a of the main pole 15 to the surface of the recording medium 100. For the magnetic head having the write shield 16, in particular, the provision of the heater outside the main pole 15 leads to protrusion of the end face of the write shield 16 located around the end face 15a of the main pole 15, and thus makes the aforementioned problem more noticeable.

In contrast, in the present embodiment, since at least part of the heater 80 is received in the receiving space 150 formed in the main pole 15, the main pole 15 can be efficiently heated by the heater 80. Further, the heat generated by the heater 80 is transferred through the main pole 15 to components of the magnetic head other than the main pole 15. Thus, when compared with the main pole 15, the components of the magnetic head other than the main pole 15 will receive less heat. Accordingly, the present embodiment allows the main pole 15 to be heated by the heater 80 while preventing the components of the magnetic head other than the main pole 15 from being heated by the heater 80. Consequently, the present embodiment makes it possible to increase the amount of protrusion of the end face 15a of the main pole 15 while suppressing protrusion of part of the medium facing surface 90 other than the end face 15a of the main pole 15.

Further, as shown in FIG. 7, the present embodiment allows the end face 15a of the main pole 15 to protrude by the greatest amount when compared with the other parts of the end face of the write head unit 9 located in the medium facing surface 90. The present embodiment thus makes it possible to recognize and control the distance from the end face 15a of the main pole 15 to the surface of the recording medium 100.

Now, a description will be given of an example of how to recognize and control the distance from the end face 15a of the main pole 15 to the surface of the recording medium 100. The amount of protrusion of the end face 15a of the main pole 15 has a correlation with the magnitude of supply power to the heater 80. Before shipment of a magnetic disk drive as a final product, the following test is performed. In the test, with the slider floated above the surface of a rotating recording medium 100, the magnitude of the power being supplied to the heater 80 is gradually increased to gradually increase the amount of protrusion of the end face 15a of the main pole 15. Upon contact of the end face 15a of the main pole 15 with the surface of the recording medium 100, the contact is detected by the contact sensor 77. This test determines the magnitude of supply power to the heater 80 at which the end face 15a of the main pole 15 comes into contact with the surface of the recording medium 100. Such magnitude of supply power will be referred to "power at contact". At the time of shipment of a magnetic disk drive as a final product, the magnitude of supply power to the heater 80 is set to a predetermined value smaller than the power at contact. In this case, the distance from the end face 15a of the main pole 15 to the surface of the recording medium 100 can be recognized and controlled by the magnitude of supply power to the heater 80.

If the amount of protrusion of any part of the end face of the write head unit 9 other than the end face 15a of the main pole 15 is the greatest unlike the present embodiment, in the aforementioned test the contact sensor 77 detects a contact of the part other than the end face 15a of the main pole 15 with the surface of the recording medium 100. At this time, the distance from the end face 15a of the main pole 15 to the surface of the recording medium 100 is unknown. Thus, in this case, it is not possible to recognize and control the distance from the end face 15a of the main pole 15 to the surface of the recording medium 100.

It should be noted that in the present embodiment, the heater 72 can heat a plurality of components of the magnetic head located near the heater 72, and can thereby allow the end face of the read heat unit 8 to protrude toward the recording medium 100 so as to reduce the distance from the read head unit 8 to the surface of the recording medium 100. This makes it possible to provide an increased recording density while preventing the reading capability of the read head unit 8 from being reduced with higher density recording.

Second Embodiment

Figure 8:
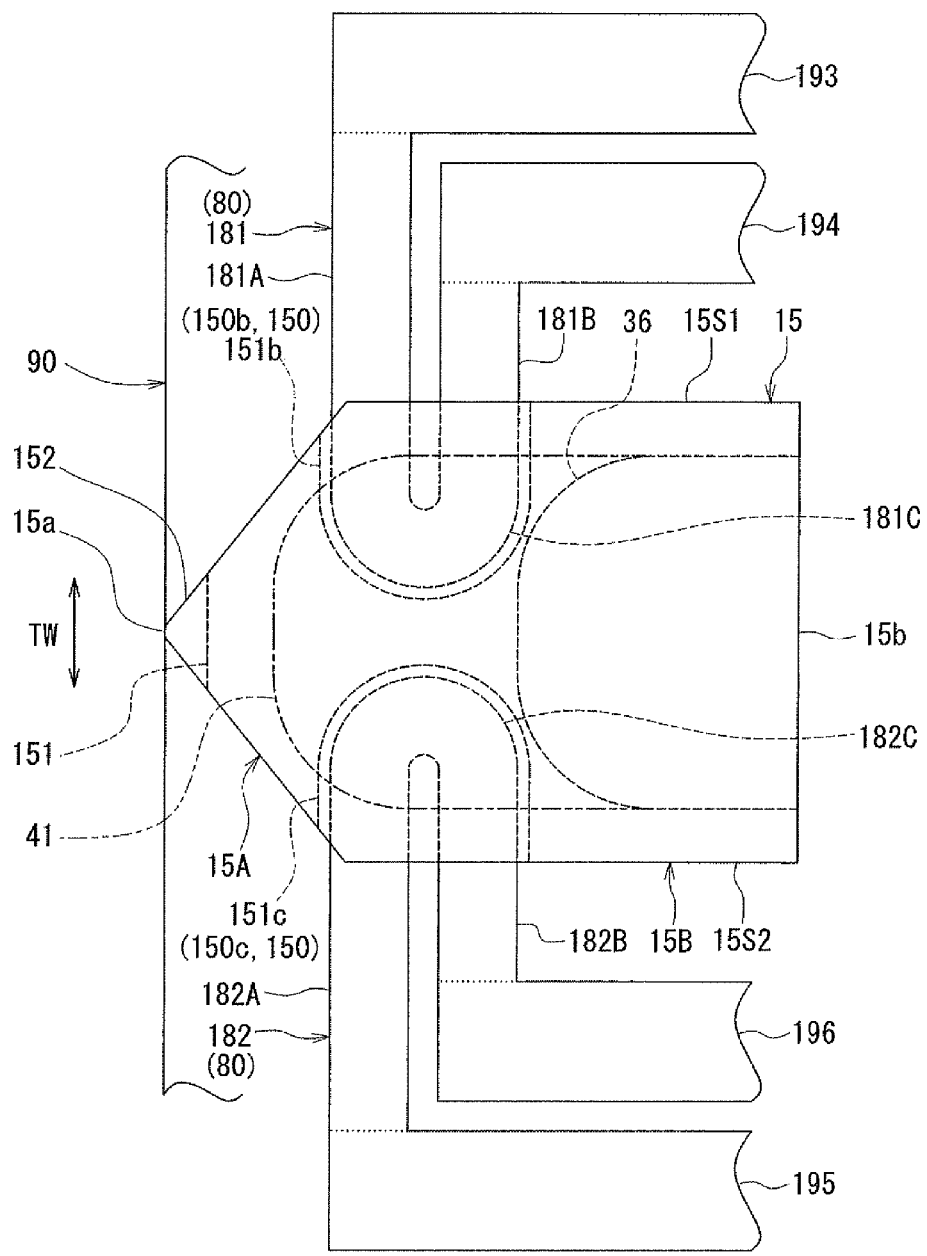
FIG. 8 is a plan view showing a main pole and a heater of a magnetic head according to a second embodiment of the invention.

A magnetic head according to a second embodiment of the invention will now be described with reference to FIG. 8. FIG. 8 is a plan view showing the main pole 15 and the heater 80 of the magnetic head according to the present embodiment. In the magnetic head according to the present embodiment, the main pole 15 and the heater 80 differ from those of the first embodiment in shape.

The first layer 151 of the main pole 15 of the present embodiment has two recesses 151b and 151c that open at the top surface of the first layer 151, in place of the recess 151a of the first embodiment. The recesses 151b and 151c are disposed to sandwich the main cross section. The recess 151b is formed to extend from the first side part 15S1 of the main pole 15 to a midpoint between the first side part 15S1 and the main cross section. The recess 151c is formed to extend from the second side part 15S2 of the main pole 15 to a midpoint between the second side part 15S2 and the main cross section. As shown in FIG. 8, when viewed from above, the sidewall of the recess 151b and that of the recess 151c are both U-shaped, for example.

The receiving space 150 of the present embodiment includes a receiving space 150b defined by the bottom and the sidewall of the recess 151b and the bottom surface of the second layer 152, and a receiving space 150c defined by the bottom and the sidewall of the recess 151c and the bottom surface of the second layer 152.

The heater 80 of the present embodiment includes two line-shaped conductors 181 and 182 that generate heat when energized, in place of the line-shaped conductor 81 of the first embodiment. The line-shaped conductor 181 includes two linear portions 181A and 181B extending linearly in the track width direction TW, and a connecting portion 181C connecting one end of the linear portion 181A to one end of the linear portion 181B. The connecting portion 181C is U-shaped, for example. The linear portion 181B is located farther from the medium facing surface 90 than is the linear portion 181A. The connecting portion 181C and a part of each of the linear portions 181A and 181B are located in the receiving space 150b. The other end of the linear portion 181A and the other end of the linear portion 181B are located outside the receiving space 150b.

The line-shaped conductor 182 includes two linear portions 182A and 182B extending linearly in the track width direction TW, and a connecting portion 182C connecting one end of the linear portion 182A to one end of the linear portion 182B. The connecting portion 182C is U-shaped, for example. The linear portion 182B is located farther from the medium facing surface 90 than is the linear portion 182A. The connecting portion 182C and a part of each of the linear portions 182A and 182B are located in the receiving space 150c. The other end of the linear portion 182A and the other end of the linear portion 182B are located outside the receiving space 150c.

The magnetic head according to the present embodiment includes leads 193, 194, 195 and 196 in place of the leads 191 and 192 of the first embodiment. The lead 193 is connected to the other end of the linear portion 181A. The lead 194 is connected to the other end of the linear portion 181B. The line-shaped conductor 181 is configured to be energized through the leads 193 and 194 to thereby generate heat. In FIG. 8, the boundary between the linear portion 181A and the lead 193 and the boundary between the linear portion 181B and the lead 194 are shown by dotted lines.

The lead 195 is connected to the other end of the linear portion 182A. The lead 196 is connected to the other end of the linear portion 182B. The line-shaped conductor 182 is configured to be energized through the leads 195 and 196 to thereby generate heat. In FIG. 8, the boundary between the linear portion 182A and the lead 195 and the boundary between the linear portion 182B and the lead 196 are shown by dotted lines.

Although not illustrated, as in the first embodiment, the magnetic head includes an insulating portion made of an insulating material and insulating the line-shaped conductor 181 from the main pole 15, and an insulating portion made of an insulating material and insulating the line-shaped conductor 182 from the main pole 15.

In the present embodiment, the line-shaped conductors 181 and 182 of the heater 80 generate heat when energized, and the heat is transferred to the main pole 15. The main pole 15 is thus heated by the heater 80.

The remainder of configuration, function and effects of the present embodiment are similar to those of the first embodiment.

Third Embodiment

Figure 9:
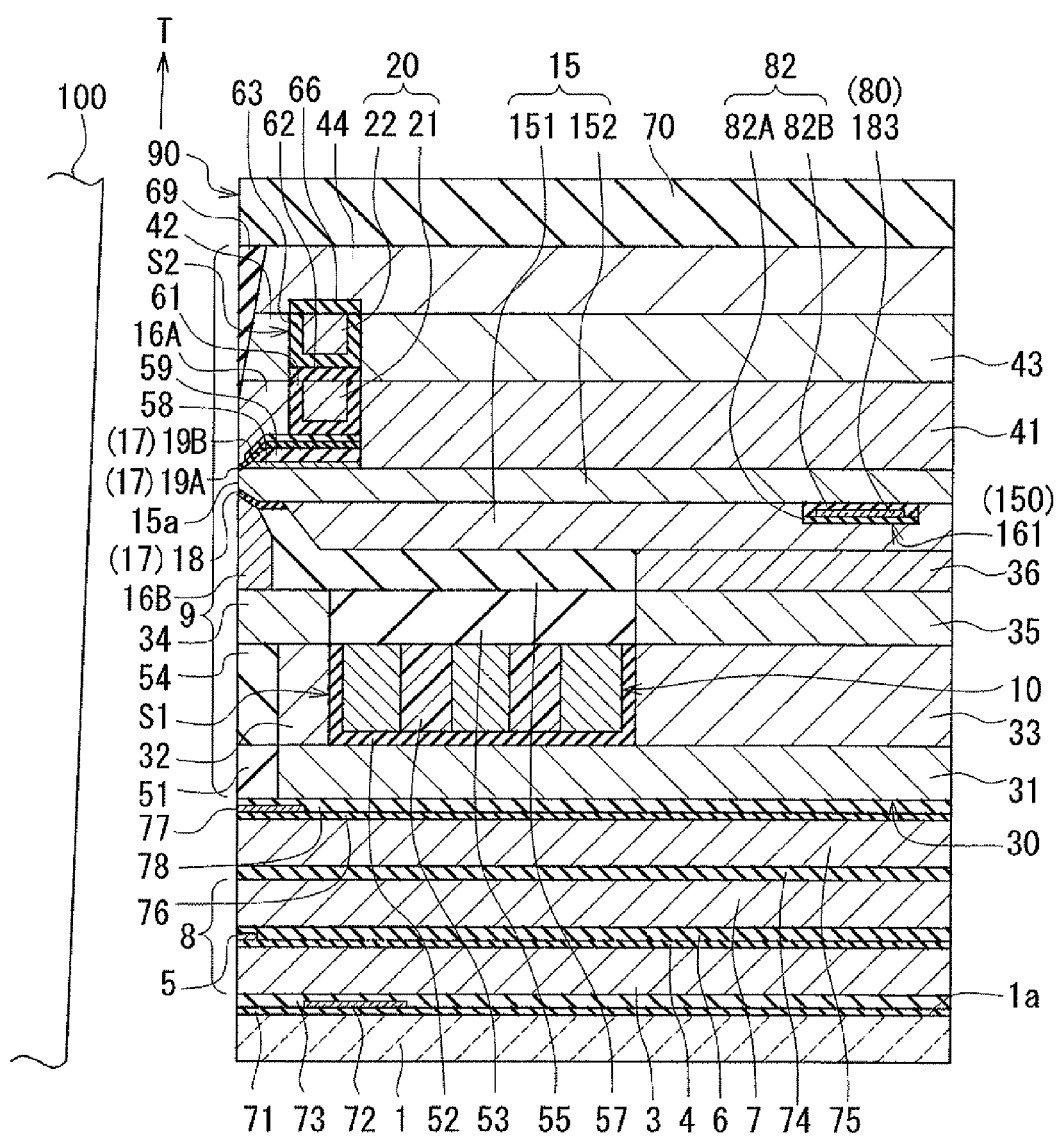
FIG. 9 is a cross-sectional view showing a magnetic head according to a third embodiment of the invention.
Figure 10:
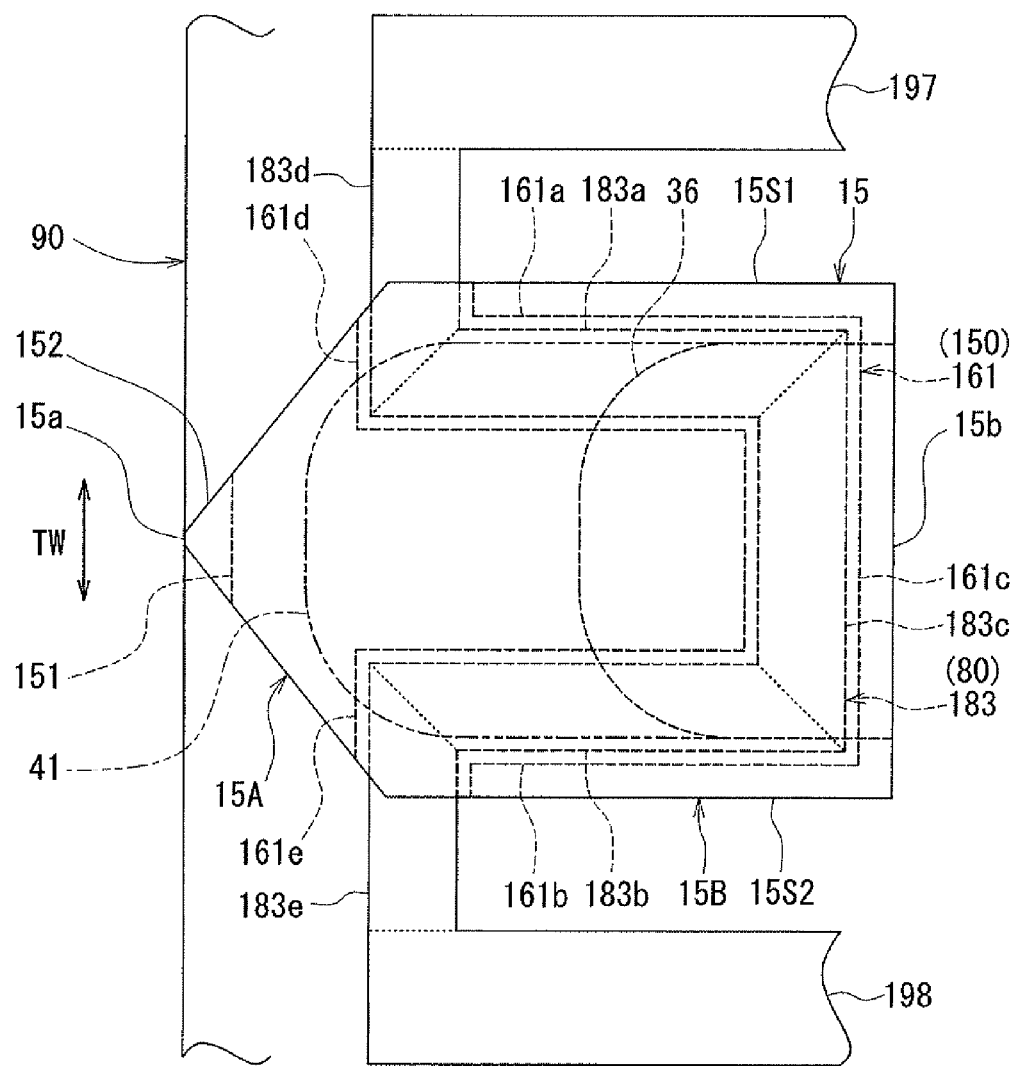
FIG. 10 is a plan view showing a main pole and a heater of the magnetic head according to the third embodiment of the invention.

A magnetic head according to a third embodiment of the invention will now be described with reference to FIG. 9 and FIG. 10. FIG. 9 is a cross-sectional view showing the magnetic head according to the present embodiment. FIG. 10 is a plan view showing the main pole 15 and the heater 80 of the magnetic head according to the present embodiment. In the magnetic head according to the present embodiment, the main pole 15 and the heater 80 differ from those of the first embodiment in shape.

The first layer 151 of the main pole 15 of the present embodiment has a recess 161 that opens at the top surface of the first layer 151, in place of the recess 151a of the first embodiment. The recess 161 includes a first portion 161a, a second portion 161b, a third portion 161c, a fourth portion 161d, and a fifth portion 161e. The first portion 161a is located near the first side part 15S1 and extends in the direction perpendicular to the medium facing surface 90. The second portion 161b is located near the second side part 15S2 and extends in the direction perpendicular to the medium facing surface 90. The third portion 161c is located near the rear end 15b and extends in the direction perpendicular to the main cross section. One end of the third portion 161c is connected to one end of the first portion 161a. The other end of the third portion 161c is connected to one end of the second portion 161b.

One end of the fourth portion 161d is connected to the other end of the first portion 161a. The other end of the fourth portion 161d is located at the first side part 15S1. One end of the fifth portion 161e is connected to the other end of the third portion 161c. The other end of the fifth portion 161e is located at the second side part 15S2. The receiving space 150 of the present embodiment is a space defined by the bottom and the sidewall of the recess 161 and the bottom surface of the second layer 152.

The heater 80 of the present embodiment includes a line-shaped conductor 183 that generates heat when energized, in place of the line-shaped conductor 81 of the first embodiment. At least part of the line-shaped conductor 183 is received in the receiving space 150.

As in the first embodiment, the magnetic head includes an insulating portion 82 made of an insulating material and insulating the line-shaped conductor 183 from the main pole 15. The insulating portion 82 includes an insulating layer 82A and an insulating layer 82B stacked. The insulating layer 82A is formed on the bottom of the recess 161. At least part of the line-shaped conductor 183 is located on the insulating layer 82A. The insulating layer 82B covers the insulating layer 82A and the at least part of the line-shaped conductor 183.

The line-shaped conductor 183 includes a first portion 183a, a second portion 183b, a third portion 183c, a fourth portion 183d, and a fifth portion 183e. The first portion 183a is located in the first portion 161a of the recess 161. The second portion 183b is located in the second portion 161b of the recess 161. The third portion 183c is located in the third portion 161c of the recess 161. One end of the third portion 183c is connected to one end of the first portion 183a. The other end of the third portion 183c is connected to one end of the second portion 183b.

Part of the fourth portion 183d is located in the fourth portion 161d of the recess 161. One end of the fourth portion 183d is connected to the other end of the first portion 183a. The other end of the fourth portion 183d is located outside the receiving space 150. Part of the fifth portion 183e is located in the fifth portion 161e of the recess 161. One end of the fifth portion 183e is connected to the other end of the third portion 183c. The other end of the fifth portion 183e is located outside the receiving space 150.

The magnetic head according to the present embodiment includes leads 197 and 198 in place of the leads 191 and 192 of the first embodiment. The lead 197 is connected to the other end of the fourth portion 183d. The lead 198 is connected to the other end of the fifth portion 183e. The line-shaped conductor 183 is configured to be energized by the leads 197 and 198 to thereby generate heat. In FIG. 10, the boundary between the fourth portion 183d and the lead 197, the boundary between the fifth portion 183e and the lead 198, and the boundaries between the five portions of the line-shaped conductor 183 are shown by dotted lines.

In the present embodiment, the line-shaped conductor 183 of the heater 80 generates heat when energized, and the heat is transferred to the main pole 15. The main pole 15 is thus heated by the heater 80.

The remainder of configuration, function and effects of the present embodiment are similar to those of the first embodiment.

Fourth Embodiment

Figure 11:
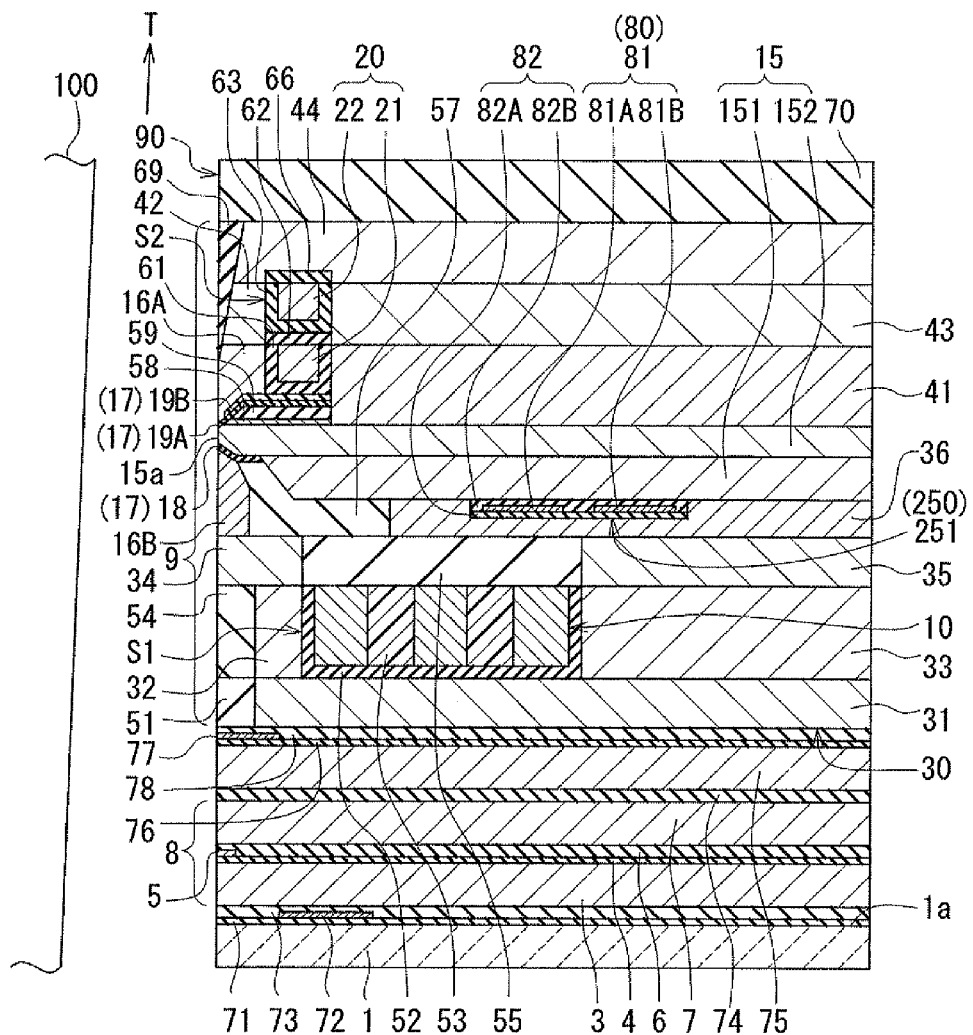
FIG. 11 is a cross-sectional view showing a magnetic head according to a fourth embodiment of the invention.

A magnetic head according to a fourth embodiment of the invention will now be described with reference to FIG. 11. FIG. 11 is a cross-sectional view showing the magnetic head according to the present embodiment. In the magnetic head according to the present embodiment, the shapes of the main pole 15 and the magnetic layer 36 and the locations of the receiving space and the heater 80 are different from the first embodiment.

In the present embodiment, the first layer 151 of the main pole 15 does not have the recess 151a, and the main pole 15 does not have the receiving space 150 formed therein. The magnetic layer 36 of the present embodiment is disposed on the top surface of the magnetic layer 35 and part of the top surface of the insulating layer 55. An end of the magnetic layer 36 of the present embodiment closest to the medium facing surface 90 is located closer to the medium facing surface 90 than is an end of the magnetic layer 36 of the first embodiment closest to the medium facing surface 90. In the present embodiment, a receiving space 250 for receiving at least part of the heater 80 is formed between the main pole 15 and the magnetic layer 36. The magnetic layer 36 is located away from the medium facing surface 90 and in contact with a portion of the main pole 15 located away from the medium facing surface 90. More specifically, the magnetic layer 36 is in contact with a portion of the bottom surface of the main pole 15 located away from the medium facing surface 90.

The magnetic layer 36 of the present embodiment has a recess 251 that opens at the top surface of the magnetic layer 36. The recess 251 has the same shape as the recess 151a of the first embodiment. The opening of the recess 251 is capped by the bottom surface of the first layer 151 of the main pole 15. The receiving space 250 is a space defined by the bottom and the sidewall of the recess 251 and the bottom surface of the first layer 151. In the present embodiment, at least part of the heater 80 is received in the receiving space 250. The heater 80 has the same configuration as that in the first embodiment.

The insulating portion 82 of the present embodiment insulates the line-shaped conductor 81 of the heater 80 from the main pole 15 and the magnetic layer 36. The insulating portion 82 includes an insulating layer 82A and an insulating layer 82B stacked. The insulating layer 82A is formed on the bottom of the recess 251. At least part of the line-shaped conductor 81 is located on the insulating layer 82A. The insulating layer 82B covers the insulating layer 82A and the at least part of the line-shaped conductor 81.

In the present embodiment, at least part of the heater 80 is received in the receiving space 250 formed between the main pole 15 and the magnetic layer 36 which is in contact with a portion of the main pole 15 located away from the medium facing surface 90. This allows the main pole 15 to be efficiently heated by the heater 80. The heat generated by the heater 80 is transferred through the main pole 15 and the magnetic layer 36 to components of the magnetic head other than the main pole 15. The magnetic layer 36 is located away from the medium facing surface 90. Thus, when compared with the main pole 15, the components of the magnetic head that are other than the main pole 15 and located near the medium facing surface 90 will receive less heat. Consequently, the present embodiment makes it possible to increase the amount of protrusion of the end face 15a of the main pole 15 while suppressing protrusion of portions located around the end face 15a of the main pole 15 in the medium facing surface 90.

The remainder of configuration, function and effects of the present embodiment are similar to those of the first embodiment. It should be noted that in the present embodiment, the configurations of the receiving space 250 and the heater 80 may be the same as those in the second or third embodiment. Further, the main pole 15 of the present embodiment may be formed of a single layer.

Fifth Embodiment

Figure 12:
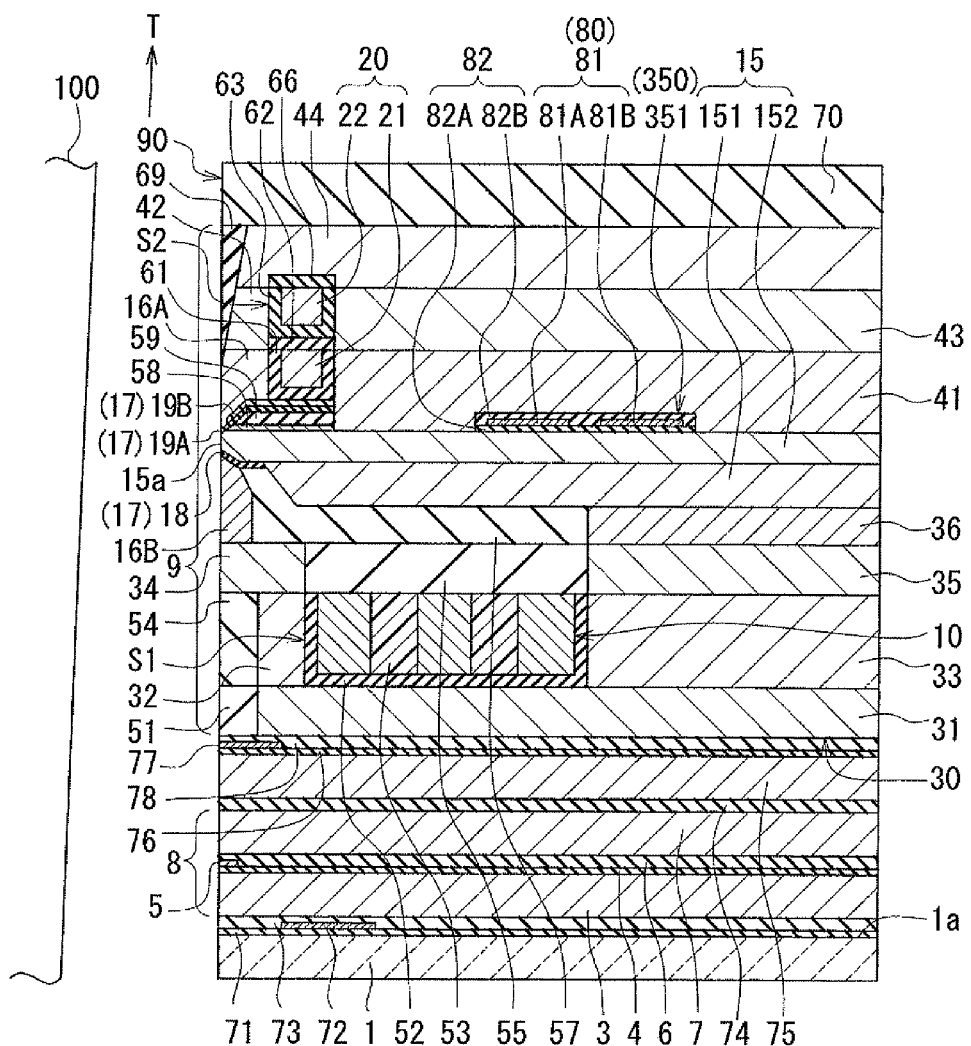
FIG. 12 is a cross-sectional view showing a magnetic head according to a fifth embodiment of the invention.

A magnetic head according to a fifth embodiment of the invention will now be described with reference to FIG. 12. FIG. 12 is a cross-sectional view showing the magnetic head according to the present embodiment. In the magnetic head according to the present embodiment, the shapes of the main pole 15 and the magnetic layer 41 and the locations of the receiving space and the heater 80 are different from the first embodiment.

In the present embodiment, the first layer 151 of the main pole 15 does not have the recess 151a, and the main pole 15 does not have the receiving space 150 formed therein. In the present embodiment, a receiving space 350 for receiving at least part of the heater 80 is formed between the main pole 15 and the magnetic layer 41. The magnetic layer 41 is located away from the medium facing surface 90 and in contact with a portion of the main pole 15 located away from the medium facing surface 90. More specifically, the magnetic layer 41 is in contact with a portion of the top surface of the main pole 15 located away from the medium facing surface 90.

The magnetic layer 41 of the present embodiment has a recess 351 that opens at the bottom surface of the magnetic layer 41. The recess 351 is shaped to be upside down to the recess 151a of the first embodiment. The opening of the recess 351 is capped by the top surface of the second layer 152 of the main pole 15. The receiving space 350 is a space defined by the top and the sidewall of the recess 351 and the top surface of the second layer 152. In the present embodiment, at least part of the heater 80 is received in the receiving space 350. The heater 80 has the same configuration as that in the first embodiment.

The insulating portion 82 of the present embodiment insulates the line-shaped conductor 81 of the heater 80 from the main pole 15 and the magnetic layer 41. The insulating portion 82 includes an insulating layer 82A and an insulating layer 82B stacked. The insulating layer 82A is formed on the top surface of the second layer 152 in the recess 351. At least part of the line-shaped conductor 81 is located on the insulating layer 82A. The insulating layer 82B covers the insulating layer 82A and the at least part of the line-shaped conductor 81.

In the present embodiment, at least part of the heater 80 is received in the receiving space 350 formed between the main pole 15 and the magnetic layer 41 which is in contact with a portion of the main pole 15 located away from the medium facing surface 90. This allows the main pole 15 to be efficiently heated by the heater 80. The heat generated by the heater 80 is transferred through the main pole 15 and the magnetic layer 41 to components of the magnetic head other than the main pole 15. The magnetic layer 41 is located away from the medium facing surface 90. Thus, when compared with the main pole 15, the components of the magnetic head that are other than the main pole 15 and located near the medium facing surface 90 will receive less heat. Consequently, the present embodiment makes it possible to increase the amount of protrusion of the end face 15a of the main pole 15 while suppressing protrusion of portions located around the end face 15a of the main pole 15 in the medium facing surface 90.

The remainder of configuration, function and effects of the present embodiment are similar to those of the first embodiment. It should be noted that in the present embodiment, the configurations of the receiving space 350 and the heater 80 may be the same as those in the second or third embodiment. The main pole 15 of the present embodiment may be formed of a single layer. Further, in the present embodiment, a recess that opens at the top surface of the main pole 15 may be formed in the main pole 15 in place of the recess 351.

The present invention is not limited to the foregoing embodiments, and various modifications may be made thereto. For example, the heater of the present invention is not limited to the one described in each of the foregoing embodiments, and may be any other heater capable of generating heat.

Further, in the present invention, the heater 72 and the contact sensor 77 are not essential components, and can be dispensed with.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
    a medium facing surface facing a recording medium;
    a coil producing a magnetic field that corresponds to data to be written on the recording medium,
    a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system; and
    a heater for heating the main pole, wherein
    the main pole is shaped to have a receiving space formed therein for receiving at least part of the heater, and
    the at least part of the heater is received in the receiving space.

2. The magnetic head for perpendicular magnetic recording according to claim 1, wherein
    the main pole includes a first layer and a second layer stacked, and
    the receiving space is sandwiched between the first layer and the second layer.

3. The magnetic head for perpendicular magnetic recording according to claim 1, wherein the heater includes a line-shaped conductor that generates heat when energized,
    the magnetic head further comprising an insulating portion insulating the line-shaped conductor from the main pole.

4. The magnetic head for perpendicular magnetic recording according to claim 1, further comprising: a write shield made of a magnetic material and having an end face located in the medium facing surface; and a gap part made of a nonmagnetic material and provided between the main pole and the write shield.

5. A magnetic head for perpendicular magnetic recording, comprising:
    a medium facing surface facing a recording medium;
    a coil producing a magnetic field that corresponds to data to be written on the recording medium;
    a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
    a magnetic layer made of a magnetic material, located away from the medium facing surface and being in contact with a portion of the main pole located away from the medium facing surface; and
    a heater for heating the main pole, wherein
    the main pole and the magnetic layer form therebetween a receiving space for receiving at least part of the heater, and
    the at least part of the heater is received in the receiving space.

6. The magnetic head for perpendicular magnetic recording according to claim 5, wherein the heater includes a line-shaped conductor that generates heat when energized,
    the magnetic head further comprising an insulating portion insulating the line-shaped conductor from the main pole and the magnetic layer.

7. The magnetic head for perpendicular magnetic recording according to claim 5, further comprising: a write shield made of a magnetic material and having an end face located in the medium facing surface; and a gap part made of a nonmagnetic material and provided between the main pole and the write shield.

* * * * *